(12) United States Patent
Liu et al.

(10) Patent No.: US 11,816,842 B2
(45) Date of Patent: Nov. 14, 2023

(54) IMAGE PROCESSING METHOD, APPARATUS, ELECTRONIC DEVICE, AND STORAGE MEDIUM

(71) Applicant: ALIBABA GROUP HOLDING LIMITED, Grand Cayman (KY)

(72) Inventors: Jinlin Liu, Beijing (CN); Yuan Yao, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 245 days.

(21) Appl. No.: 17/181,510

(22) Filed: Feb. 22, 2021

(65) Prior Publication Data

US 2021/0279883 A1 Sep. 9, 2021

(30) Foreign Application Priority Data

Mar. 5, 2020 (CN) .......................... 202010145504.8

(51) Int. Cl.
*G06T 7/12* (2017.01)
*G06T 7/174* (2017.01)
*G06T 3/40* (2006.01)

(52) U.S. Cl.
CPC ............ *G06T 7/12* (2017.01); *G06T 3/40* (2013.01); *G06T 7/174* (2017.01); *G06T 2207/30168* (2013.01)

(58) Field of Classification Search
CPC .... G06T 7/00; G06T 7/10; G06T 7/12; G06T 7/0004; G06T 7/11; G06T 7/13; G06T 7/0002; G06T 7/194; G06T 7/70; G06T 7/73; G06T 3/0012; G06T 2207/20084; G06T 3/4046; G06T 9/002;
(Continued)

(56) References Cited

U.S. PATENT DOCUMENTS 7,162,101 B2 * 1/2007 Itokawa .................... G06T 7/12
382/199
7,227,893 B1 6/2007 Srinivasa et al.
(Continued)

FOREIGN PATENT DOCUMENTS

CN 101806583 A * 8/2010
CN 108805889 A * 11/2018
(Continued)

*Primary Examiner* — Ian L Lemieux
*Assistant Examiner* — Woo C Rhim

(57) ABSTRACT

Image processing methods, devices, and storage media are provided. One of the image processing methods includes: obtaining an image comprising a target object; inputting the image into a mask prediction model to obtain a first mask image corresponding to the target object in the image; inputting the first mask image and the image comprising the target object into a mask quality unification model to obtain a second mask image, wherein the mask quality unification model is configured to adjust a fineness associated with the first mask image to a target fineness to obtain the second mask image, and wherein the second mask image has image semantic information consistent with image semantic information of the image comprising the target object; and inputting the image comprising the target object and the second mask image into a target image obtaining model to obtain a target image corresponding to the target object.

14 Claims, 5 Drawing Sheets

(58) Field of Classification Search
CPC .......... G06T 2207/20081; G06V 10/20; G06V 10/26; G06V 10/00; G06V 10/40; G06V 10/44; G06V 20/00; G06V 10/70; G06V 10/88; G06V 10/82; G06V 30/18057; G06V 10/774; G06N 3/02; G06N 3/04; G06N 3/0454; G06N 3/06; G06N 3/063; G06N 3/082; G06N 3/08; G06N 3/084; G06N 20/00–20/20; G06K 9/6256–9/6259
See application file for complete search history.

(56) References Cited

U.S. PATENT DOCUMENTS

| | | | |
|---|---|---|---|
| 7,724,962 B2 | 5/2010 | Zhu et al. | |
| 8,126,269 B2* | 2/2012 | Eggert | G06T 7/215 382/164 |
| 8,213,737 B2* | 7/2012 | Steinberg | G06V 10/242 382/254 |
| 8,290,253 B1 | 10/2012 | Wang et al. | |
| 8,331,645 B2 | 12/2012 | Preil et al. | |
| 8,824,808 B2 | 9/2014 | Brandt et al. | |
| 9,514,386 B2 | 12/2016 | Scott et al. | |
| 9,916,538 B2 | 3/2018 | Zadeh et al. | |
| 9,978,003 B2* | 5/2018 | Sachs | G06T 7/90 |
| 10,402,995 B2 | 9/2019 | Kwant et al. | |
| 10,628,700 B2 | 4/2020 | Puri et al. | |
| 10,636,148 B1 | 4/2020 | Chen et al. | |
| 10,657,647 B1 | 5/2020 | Chen et al. | |
| 10,943,352 B2* | 3/2021 | Sun | G06V 10/82 |
| 2009/0219379 A1* | 9/2009 | Rossato | G06T 7/194 348/E7.078 |
| 2013/0195361 A1* | 8/2013 | Deng | G06F 16/5854 382/195 |
| 2017/0213112 A1* | 7/2017 | Sachs | G06T 7/11 |
| 2017/0255830 A1* | 9/2017 | Chen | G06V 20/41 |
| 2017/0357895 A1 | 12/2017 | Karlinsky et al. | |
| 2018/0157904 A1* | 6/2018 | Girish | G06V 10/764 |
| 2018/0204111 A1 | 7/2018 | Zadeh et al. | |
| 2018/0232887 A1* | 8/2018 | Lin | G06T 7/12 |
| 2020/0218961 A1* | 7/2020 | Kanazawa | G06N 20/20 |
| 2020/0250436 A1* | 8/2020 | Lee | G06K 9/627 |
| 2020/0273176 A1* | 8/2020 | Takeda | G06V 10/25 |
| 2020/0294240 A1* | 9/2020 | Wang | G06T 7/11 |
| 2020/0410668 A1* | 12/2020 | Tchou | G06K 9/6222 |
| 2021/0082118 A1* | 3/2021 | Zhang | G06T 7/11 |
| 2021/0118112 A1* | 4/2021 | Huang | G06N 3/0472 |
| 2021/0158549 A1* | 5/2021 | Veeravasarapu | G06T 7/337 |
| 2021/0224312 A1* | 7/2021 | Harikumar | G06F 16/532 |
| 2021/0224591 A1* | 7/2021 | Mukherjee | G06K 9/6256 |
| 2022/0058821 A1* | 2/2022 | Fu | G06K 9/6267 |

FOREIGN PATENT DOCUMENTS

| | | | | |
|---|---|---|---|---|
| CN | 108898610 A | * | 11/2018 | |
| CN | 108961279 A | * | 12/2018 | |
| CN | 110110731 A | * | 8/2019 | |
| CN | 110136144 A | * | 8/2019 | |
| CN | 110705558 A | * | 1/2020 | |
| CN | 112907501 A | * | 6/2021 | |
| EP | 3021281 A2 | * | 5/2016 | ......... G06K 9/00624 |
| WO | WO-2019100888 A1 | * | 5/2019 | ......... G06K 9/00248 |
| WO | WO-2021057848 A1 | * | 4/2021 | |

\* cited by examiner

IMAGE PROCESSING METHOD, APPARATUS, ELECTRONIC DEVICE, AND STORAGE MEDIUM

CROSS-REFERENCE TO RELATED APPLICATIONS

The present application is based on and claims priority to the Chinese Patent Application No. 202010145504.8, filed on Mar. 5, 2020, and entitled "IMAGE PROCESSING METHOD, APPARATUS, ELECTRONIC DEVICE, AND STORAGE MEDIUM." The above-referenced application is incorporated herein by reference in its entirety.

TECHNICAL FIELD

The application relates to the field of computer technologies. In particular, the application relates to an image processing method, apparatus, electronic device, and storage medium.

BACKGROUND

Image segmentation is widely applied to fields such as poster design, identification (ID) photography, image editing, and medical image processing. Image segmentation is a basic operation in image processing and editing and is a process of partitioning an image into several areas with special properties and proposing a target of interest. Existing image segmentation methods include an area-based segmentation method, an edge-based segmentation method, and the like. A basic process of the edge-based segmentation method is as follows. First, an edge of a target image is obtained from a larger image to be processed, and the larger image is then segmented according to the edge of the target image, to obtain the target image.

Existing edge-based segmentation methods generally include the following types. The first type is interactive image matting, for example, image matting based on computer image processing software. The second type is smart image matting, for example, automatic smart image matting using online image matting software. The third type is deep-learning-based image matting. In the foregoing types of existing edge-based segmentation methods, the first type of segmentation methods requires participation of a large number of users, resulting in low efficiency and low fineness. The second type of segmentation methods of does not require participation of a large number of users but provides an unsatisfactory effect, and generally, cannot finely segment an image. In the third type of segmentation methods, a fine contour of a target image in an image to be processed needs to be obtained, to train an image segmentation model by using a large number of sample images finely labeled with sample target image contour data, causing relatively high costs of image segmentation.

SUMMARY

The application provides an image processing method, apparatus, electronic device, and storage medium, to improve fineness of image segmentation and reduce costs of image segmentation.

The application provides an image processing method, including:
  obtaining an image to be processed;
  inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;
  inputting the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and
  inputting the image to be processed and the second mask image into a target image obtaining model to obtain an image corresponding to the target object, where the target image obtaining model is configured to obtain the image corresponding to the target object according to the image to be processed and the second mask image.

In some embodiments, inputting the image to be processed into a mask prediction model to obtain a first mask image corresponding to a target object in the image to be processed includes:
  obtaining the image contour data corresponding to the target object; and
  obtaining the first mask image according to the image contour data of the target object.

In some embodiments, obtaining the image contour data corresponding to the target object includes:
  downsampling the image to be processed, to obtain a downsampled image; and
  obtaining the image contour data corresponding to the target object according to the downsampled image.

In some embodiments, downsampling the image to be processed, to obtain a downsampled image includes:
  obtaining a designated downsampling factor for the image to be processed; and
  downsampling the image to be processed according to the designated downsampling factor, to obtain the downsampled image.

In some embodiments, obtaining the image contour data corresponding to the target object according to the downsampled image includes performing image contour extraction on the target object in the downsampled image to obtain the image contour data corresponding to the target object.

In some embodiments, the image processing method further includes providing the image corresponding to the target object to a client.

In some embodiments, the image processing method further includes: obtaining, from the client, a request message for requesting to obtain the image corresponding to the target object; where
  the providing the image corresponding to the target object to a client includes: providing, in response to the request message, the image corresponding to the target object to the client.

In some embodiments, the image processing method further includes: displaying the image corresponding to the target object. In some embodiments, inputting the first mask image and the image to be processed into a mask quality unification model to obtain a second mask image includes: if the fineness of the image contour data of the first mask image is less than the target fineness, increasing the fineness of the image contour data of the first mask image to the target fineness, to obtain the second mask image.

In some embodiments, adjusting a fineness of image contour data of the first mask image to a target fineness to obtain a second mask image includes: if the fineness of the image contour data of the first mask image is greater than the target fineness, reducing the fineness of the image contour data of the first mask image to the target fineness, to obtain the second mask image.

In some embodiments, the image processing method further includes:
   obtaining the fineness of the image contour data of the first mask image; and
   comparing the fineness of the image contour data of the first mask image with the target fineness.

In some embodiments, the image processing method further includes:
   obtaining a sample image comprising a sample target object, and obtaining a sample first mask image corresponding to the sample target object in the sample image;
   obtaining a target second mask image for the sample image and the sample first mask image; and
   obtaining the mask quality unification model according to the sample image, the sample first mask image, and the target second mask image.

In some embodiments, the image processing method further includes:
   obtaining a sample image comprising a sample target object, and obtaining a sample second mask image corresponding to the sample target object in the sample image;
   obtaining, for the sample image and the sample second mask image, a sample target image corresponding to the sample target object in the sample image; and
   obtaining the target image obtaining model according to the sample image, the sample second mask image, and the sample target image.

According to another aspect of the application, an image processing apparatus is further provided, including:
   an image obtaining unit, configured to obtain an image to be processed;
   a first mask image obtaining unit, configured to: input the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;
   a second mask image obtaining unit, configured to: input the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and
   a target image obtaining unit, configured to: input the image to be processed and the second mask image into a target image obtaining model to obtain an image corresponding to the target object, where the target image obtaining model is configured to obtain the image corresponding to the target object according to the image to be processed and the second mask image.

According to another aspect of the application, an electronic device is further provided, including:
   a processor; and
   a memory, configured to store a program for an image processing method, where after being powered on, the device executes the program for the image processing method by using the processor to perform the following steps:
   obtaining an image to be processed;
   inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;
   inputting the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and
   inputting the image to be processed and the second mask image into a target image obtaining model to obtain an image corresponding to the target object, where the target image obtaining model is configured to obtain the image corresponding to the target object according to the image to be processed and the second mask image.

According to another aspect of the application, a storage device is further provided, storing a program for an image processing method, where the program is executed by a processor to perform the following steps:
   obtaining an image to be processed;
   inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;
   inputting the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and
   inputting the image to be processed and the second mask image into a target image obtaining model to obtain an image corresponding to the target object, where the target image obtaining model is configured to obtain the image corresponding to the target object according to the image to be processed and the second mask image.

According to another aspect of the application, a method for processing a mask prediction model is further provided, including:
   obtaining a sample image comprising a target object;
   obtaining first image contour data and second image contour data that correspond to the target object in the sample image, where the first image contour data has a fineness below a designated fineness threshold, and the second image contour data has a fineness equal to or higher than the designated fineness threshold;

obtaining a first mask image corresponding to the target object based on the first image contour data, and obtaining a second mask image corresponding to the target object based on the second image contour data; and obtaining a mask prediction model according to the first image contour data, the second image contour data, the first mask image corresponding to the target object based on the first image contour data, and the second mask image corresponding to the target object based on the second image contour data, where the mask prediction model is configured to obtain image contour data corresponding to another target object in an image to be processed according to the image to be processed and obtaining a first mask image corresponding to the another target object according to the image contour data of the another target object.

In some embodiments, obtaining first image contour data and second image contour data that correspond to a target object in the sample image includes:

downsampling the sample image, to obtain a downsampled sample image; and obtaining the first image contour data and the second image contour data according to the downsampled sample image.

In some embodiments, downsampling the sample image to obtain a downsampled sample image includes:

obtaining a designated downsampling factor for the sample image; and downsampling the sample image according to the designated downsampling factor, to obtain the downsampled sample image.

In some embodiments, obtaining the first image contour data and the second image contour data according to the downsampled sample image includes: performing image contour extraction on the target object in the downsampled sample image to obtain the first image contour data and the second image contour data.

According to another aspect of the application, an apparatus for processing a mask prediction model is further provided, the apparatus including:

a sample image obtaining unit, configured to obtain a sample image comprising a target object;

an image contour obtaining unit, configured to obtain first image contour data and second image contour data that correspond to the target object in the sample image, where the first image contour data has a fineness below a designated fineness threshold, and the second image contour data has a fineness equal to or higher than the designated fineness threshold;

a mask image obtaining unit, configured to: obtain a first mask image corresponding to the target object based on the first image contour data, and obtain a second mask image corresponding to the target object based on the second image contour data; and a mask prediction model obtaining unit, configured to obtain a mask prediction model according to the first image contour data, the second image contour data, the mask image corresponding to the target object based on the first image contour data, and the mask image corresponding to the target object based on the second image contour data, where the mask prediction model is configured to obtain image contour data corresponding to a target object in an image to be processed according to the image to be processed and obtaining a first mask image corresponding to the target object according to the image contour data of the target object.

According to another aspect of the application, an electronic device is further provided, the electronic device including:

a processor; and a memory, configured to store a program for a method for processing a mask prediction model, where after the device is powered on and executes the program for the method for processing a mask prediction model by using the processor, the device performs the following steps:

obtaining a sample image;

obtaining first image contour data and second image contour data that correspond to a target object in the sample image, where the first image contour data has a fineness below a designated fineness threshold, and the second image contour data has a fineness equal to or higher than the designated fineness threshold;

obtaining a first mask image corresponding to the target object based on the first image contour data, and obtaining a second mask image corresponding to the target object based on the second image contour data; and obtaining a mask prediction model according to the first image contour data, the second image contour data, the mask image corresponding to the target object based on the first image contour data, and the mask image corresponding to the target object based on the second image contour data, where the mask prediction model is configured to obtain image contour data corresponding to a target object in an image to be processed according to the image to be processed and obtaining a first mask image corresponding to the target object according to the image contour data of the target object.

According to another aspect of the application, a storage device is further provided, storing a program for a method for processing a mask prediction model, where the program is executed by a processor to perform the following steps:

obtaining a sample image;

obtaining first image contour data and second image contour data that correspond to a target object in the sample image, where the first image contour data has a fineness below a designated fineness threshold, and the second image contour data has a fineness equal to or higher than the designated fineness threshold;

obtaining a first mask image corresponding to the target object based on the first image contour data, and obtaining a second mask image corresponding to the target object based on the second image contour data; and obtaining a mask prediction model according to the first image contour data, the second image contour data, the first mask image corresponding to the target object based on the first image contour data, and the second mask image corresponding to the target object based on the second image contour data, where the mask prediction model is configured to obtain image contour data corresponding to another target object in an image to be processed according to the image to be processed and obtaining a first mask image corresponding to the another target object according to the image contour data of the another target object.

According to another aspect of the application, an image processing method is provided. The image processing method includes: obtaining an image comprising a target object; inputting the image into a mask prediction model to obtain a first mask image corresponding to the target object in the image; inputting the first mask image and the image comprising the target object into a mask quality unification model to obtain a second mask image, wherein the mask quality unification model is configured to adjust a fineness associated with the first mask image to a target fineness to obtain the second mask image, and wherein the second mask image has image semantic information consistent with image semantic information of the image comprising the target object; and inputting the image comprising the target object and the second mask image into a target image obtaining model to obtain a target image corresponding to the target object.

According to another aspect of the application, an image processing apparatus is provided. The image processing apparatus includes: one or more processors and one or more non-transitory computer-readable memories coupled to the one or more processors and configured with instructions executable by the one or more processors to cause the apparatus to perform operations comprising: obtaining an image comprising a target object; inputting the image into a mask prediction model to obtain a first mask image corresponding to the target object in the image; inputting the first mask image and the image comprising the target object into a mask quality unification model to obtain a second mask image, wherein the mask quality unification model is configured to adjust a fineness associated with the first mask image to a target fineness to obtain the second mask image, and wherein the second mask image has image semantic information consistent with image semantic information of the image comprising the target object; and inputting the image comprising the target object and the second mask image into a target image obtaining model to obtain a target image corresponding to the target object.

According to another aspect of the application, a method for image processing is provided. The method for image processing includes: obtaining a sample image comprising a target object; obtaining first image contour data and second image contour data that correspond to the target object in the sample image, wherein the first image contour data has a fineness below a fineness threshold, and the second image contour data has a fineness equal to or higher than the fineness threshold; obtaining a first mask image corresponding to the target object based on the first image contour data, and obtaining a second mask image corresponding to the target object based on the second image contour data; and obtaining a mask prediction model according to the first image contour data, the second image contour data, the first mask image corresponding to the target object, and the second mask image corresponding to the target object, wherein the mask prediction model is configured to obtain image contour data of another target object in another image and obtaining another first mask image corresponding to the another target object according to the image contour data of the another target object.

Compared with the existing technologies, the application has the following beneficial effects. According to the image processing method provided in the application, after an image to be processed is inputted into a mask prediction model, the mask prediction model obtains image contour data corresponding to a target object according to the image to be processed and obtains a first mask image according to the image contour data of the target object. After the first mask image is obtained, a fineness of image contour data of the first mask image is further adjusted to a target fineness, to obtain a second mask image, the target fineness is data determined according to a first fineness interval and a second fineness interval, and an image corresponding to the target object is obtained according to the image to be processed and the second mask image. According to the image processing method provided in the application, the first mask image is first obtained according to the image contour data of the target object, and the fineness of the image contour data of the first mask image is then adjusted to the target fineness to obtain the second mask image, thereby ensuring the fineness of the image corresponding to the target object is obtained according to the image to be processed and the second mask image. The image contour data of the target object does not need to have a high fineness when the first mask image is obtained according to the image contour data of the target object, and the mask prediction model does not need to be trained based on a large number of sample images with finely labeled image contour data, thereby reducing costs of image segmentation.

According to the method for processing a mask prediction model provided in the application, a sample image is first obtained; first image contour data and second image contour data that correspond to a target object in the sample image are then obtained for the sample image, the first image contour data has a fineness below a designated fineness threshold, and the second image contour data has a fineness equal to or higher than the designated fineness threshold; subsequently, a first mask image corresponding to the target object based on the first image contour data is obtained, and a second mask image corresponding to the target object based on the second image contour data is obtained; and a mask prediction model is finally obtained according to the first image contour data, the second image contour data, the first mask image corresponding to the target object, and the second mask image corresponding to the target object, and the mask prediction model is configured to obtain image contour data corresponding to a target object in an image to be processed according to the image to be processed and obtaining a first mask image corresponding to the target object in the image to be processed according to the image contour data of the target object. According to the method for processing a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model.

DETAILED DESCRIPTION

In the following description, many details are described for fully understanding the application. However, the application may also be implemented in other manners different from those described herein. A person skilled in the art may make analogical application without departing from content of the application. Therefore, the application is not limited by the embodiments disclosed hereinafter.

Figure 1:
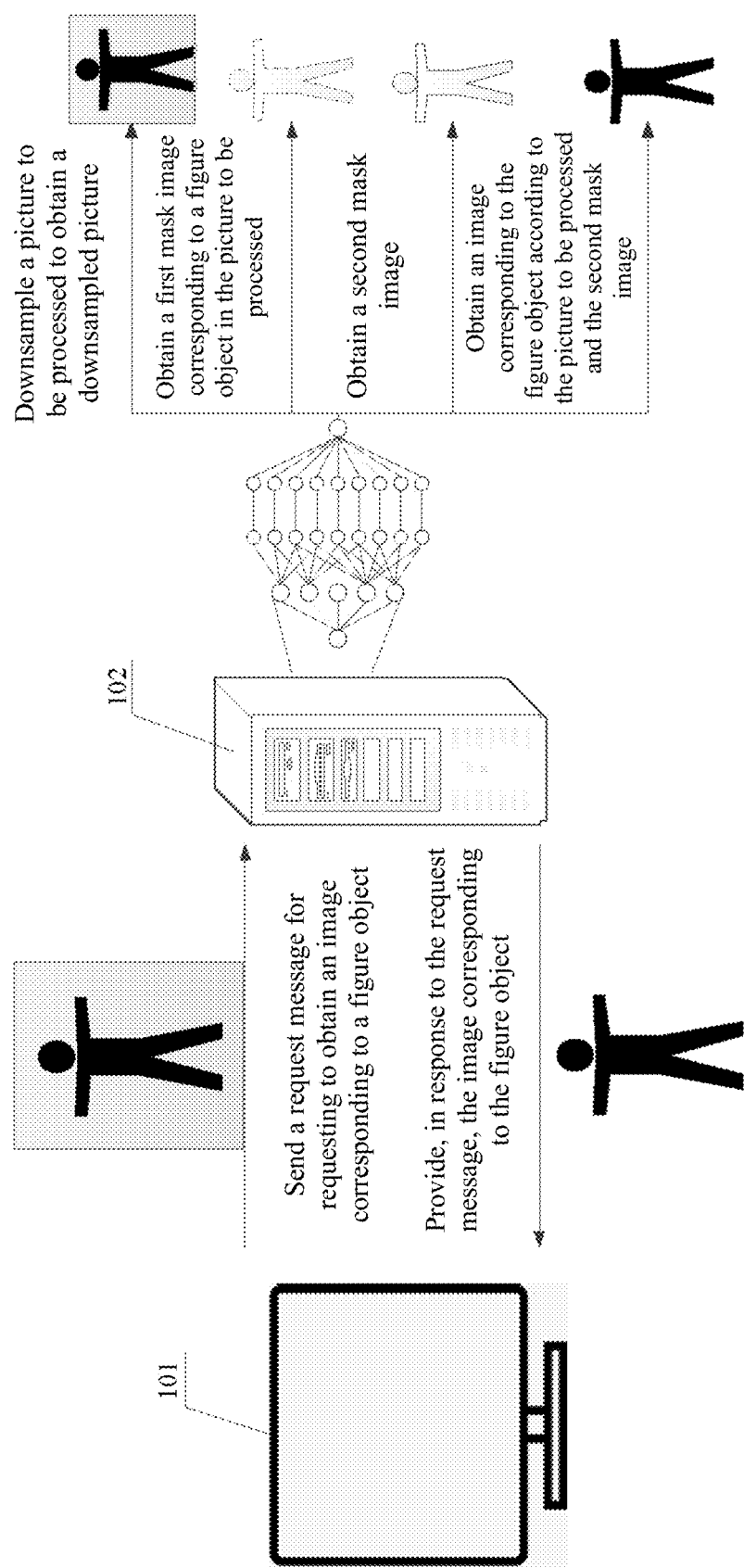
FIG. 1 is a first schematic diagram of an application scenario of an image processing method according to some embodiments of the application.

To show an image processing method provided in the application more clearly, an application scenario of the image processing method provided in the application is described first. Some embodiments provided in the application may be applied to a scenario in which a client and a server interact to perform image segmentation. FIG. 1 is a first schematic diagram of an application scenario of an image processing method according to some embodiments of the application. In the application scenario embodiment of the image processing method provided in the application, the client is an application or a program that is installed on a computing device and may operate in cooperation with the server. In the provided application scenario embodiment of the image processing method, the computing device may include: a computer, a smartphone, and the like, and the application or the program that is installed on the computing device and may operate in cooperation with the server may include: a client of an image processing application (APP) installed on the smartphone, a client of an image processing APP installed on the computer, a client of a web version image processing tool operating on a web page or the like. An application scenario in which the client of the image processing APP installed on the computer and the server interact to perform image segmentation is taken as an example to describe an application scenario of the image processing method provided in the application in detail.

First, a client 101 of an image processing APP installed on a computer sends an image to be processed to a server 102 and sends a request message for requesting to obtain an image corresponding to a target object. For example, the image to be processed may be a picture obtained by an image acquisition device, a picture composited by image compositing software, an image obtained by image editing software, an image corresponding to a video frame in a video, or the like. An example in which the image to be processed is the picture obtained by the image acquisition device is taken to describe the application scenario embodiment of the image processing method provided in the application in detail. In the example, the image to be processed is a picture to be processed. Correspondingly, the target object may be a preselected object, or may be an object selected in the image to be processed after target detection is performed on the image to be processed. In the application scenario embodiment of the image processing method provided in the application, the target object is, for example, a figure object in the picture to be processed. The target object may be a designated object in an image, for example, a designated figure object in the image to be processed or may be a combination of a plurality of designated objects, for example, a combination of a plurality of designated figures in the image to be processed or a combination of a figure and another object, for example, a combination of a figure and an item held by the figure or a combination of a figure and an accompaniment of the figure or may be designated objects of one type, for example, objects of the same type such as all pet objects in the image to be processed or all vehicles in the image to be processed.

Next, the server 102 inputs the picture to be processed into a mask prediction model, to obtain a first mask image corresponding to a figure object in the picture to be processed. The mask prediction model is configured to obtain image contour data corresponding to the figure object according to the picture to be processed and obtaining the first mask image according to the image contour data of the figure object. In the application scenario embodiment of the image processing method provided in the application, a mask image is an image partially or completely blocking the picture to be processed to keep the blocked portion from participating in image processing. The mask image indicates a target area in the picture to be processed to be segmented from the picture to be processed. In the application scenario embodiment of the image processing method provided in the application, image preprocessing such as image augmentation and image denoising may be first performed for the picture to be processed. If the target object is an object selected from the image to be processed after target detection is performed on the image to be processed, target detection based on a deep neural network, for example, target detection based on a region-CNN (R-CNN), may often be used.

To obtain the mask prediction model, in the application scenario embodiment of the image processing method provided in the application, the mask prediction model may be trained first. Training steps may include the following: obtaining a sample image; obtaining first image contour data and second image contour data that correspond to a figure object in the sample image, where the first image contour data has a fineness below a designated fineness threshold, and the second image contour data has a fineness equal to or higher than the designated fineness threshold; obtaining a mask image corresponding to the figure object based on the first image contour data, and obtaining a mask image corresponding to the figure object based on the second image contour data; and obtaining a mask prediction model according to the first image contour data, the second image contour data, the mask image corresponding to the figure object based on the first image contour data, and the mask image corresponding to the figure object based on the second image contour data, where the mask prediction model is configured to obtain image contour data corresponding to a figure object in a picture to be processed according to the picture to be processed and obtaining a first mask image corresponding to the figure object according to the image contour data of the figure object. According to the method for training a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model. In the application scenario embodiment of the image processing method provided in the application, a fineness of image contour data is a degree of precision and accuracy of image contour data.

In the application scenario embodiment of the image processing method provided in the application, a process of obtaining a first mask image corresponding to the figure object in the picture to be processed may include: obtaining a designated downsampling factor for the picture to be processed, and downsampling the picture to be processed according to the designated downsampling factor to obtain a downsampled picture; and performing image contour extraction on the figure object in the downsampled picture to obtain the image contour data corresponding to the figure object, and obtaining the first mask image according to the image contour data of the figure object. In the application scenario embodiment of the image processing method provided in the application, the downsampling is a process of scaling down an image to make the image meet the size of a display area or generate a thumbnail corresponding to the image. A process of downsampling the picture to be processed may be as follows: for a picture to be processed with a resolution of N*M, if a downsampling factor is k, one pixel is taken from every K rows and columns of pixels in the picture to be processed to form an image, and a downsampled picture is obtained.

In the application scenario embodiment of the image processing method provided in the application, the designated fineness threshold may be a limit value that is preset for the image contour data and is used for determining a degree of precision of the image contour data.

Subsequently, the server 102 adjusts a fineness of image contour data of the first mask image to a target fineness, to obtain a second mask image. An adjustment process may include: inputting the first mask image and the picture to be processed into a mask quality unification model to obtain a second mask image, where the mask quality unification model is configured to adjust a fineness of image contour data of the first mask image to a target fineness and obtaining a second mask image which has image semantic information consistent with image semantic information of the picture to be processed.

In some embodiments, the target fineness may be determined according to a first fineness interval and a second fineness interval. The first fineness interval is a fineness interval of the image contour data of the first mask image obtained by the mask prediction model when the fineness of the image contour data of the figure object does not reach the designated fineness threshold. The second fineness interval is a fineness interval of the image contour data of the first mask image obtained by the mask prediction model when the fineness of the image contour data of the figure object reaches the designated fineness threshold. For example, the fineness of the image contour data of the first mask image is first obtained. The fineness of the image contour data of the first mask image is then compared with the target fineness. Finally, if the fineness of the image contour data of the first mask image is less than the target fineness, the fineness of the image contour data of the first mask image is increased to the target fineness to obtain the second mask image. If the fineness of the image contour data of the first mask image is greater than the target fineness, the fineness of the image contour data of the first mask image is reduced to the target fineness to obtain the second mask image. In a process of adjusting the fineness of the image contour data of the first mask image to the target fineness to obtain the second mask image, shape semantic information of the second mask image may be ensured to be consistent with that of the picture to be processed. Therefore, in the process, the picture to be processed may be used as a reference image.

Finally, the server 102 obtains an image corresponding to the figure object according to the picture to be processed and the second mask image, and provides the image corresponding to the figure object to the client 101 in response to the request message. After obtaining the image corresponding to the figure object, the client 101 displays the image corresponding to the figure object. In the application scenario embodiment of the image processing method provided in the application, a process of obtaining an image corresponding to the figure object may include: inputting the picture to be processed and the second mask image into a target image obtaining model to obtain the image corresponding to the figure object, where the target image obtaining model is configured to obtain the image corresponding to the figure object according to the picture to be processed and the second mask image. A process of obtaining the image corresponding to the figure object according to the picture to be processed and the second mask image may include: multiplying the second mask image by the picture to be processed, to obtain the image corresponding to the figure object.

In conclusion, in the application scenario embodiment of the image processing method provided in the application, a process of performing image processing on the picture to be processed by the server to obtain the image corresponding to the figure object may be as follows.

Figure 1A:
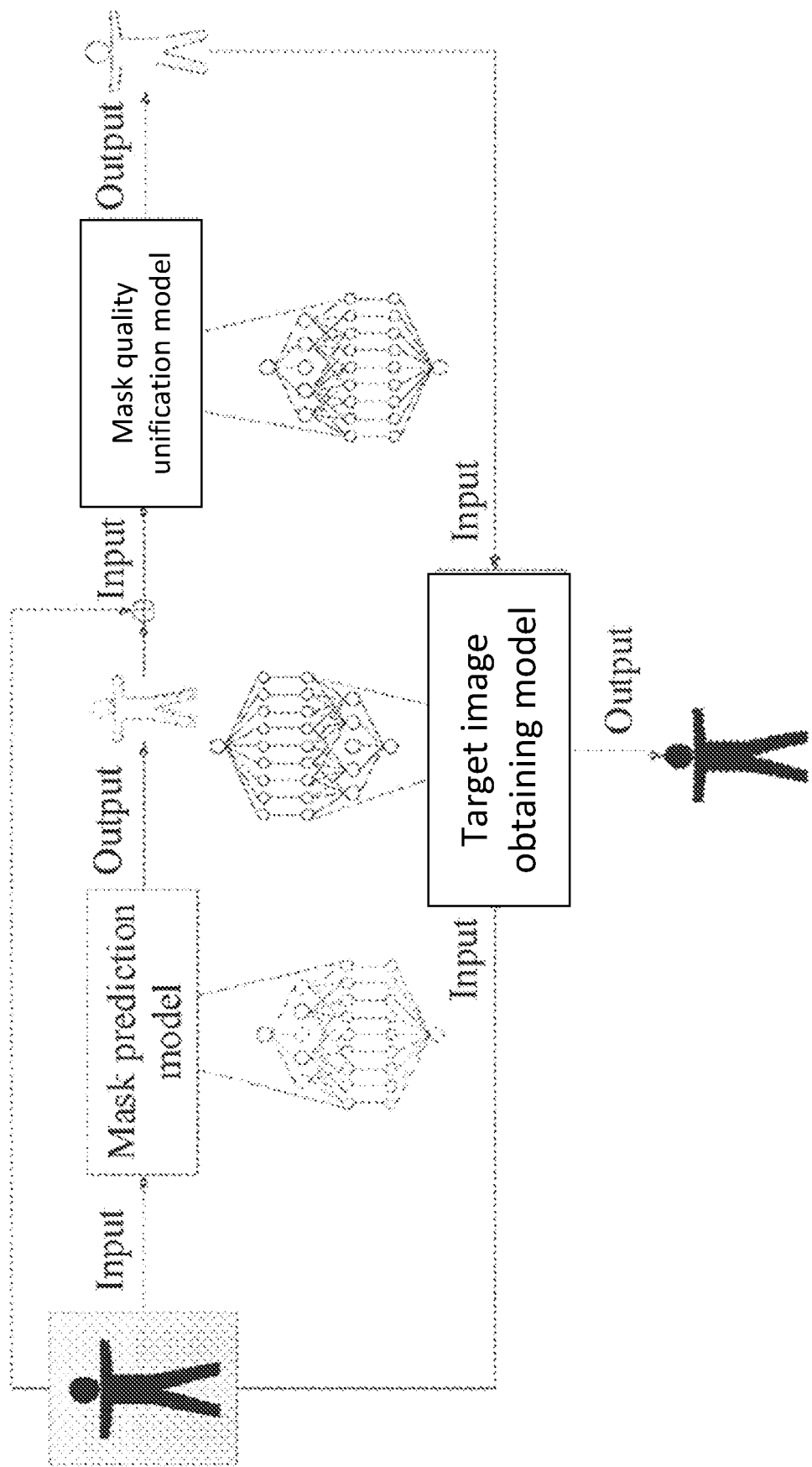
FIG. 1A is a second schematic diagram of an application scenario of an image processing method according to some embodiments of the application.

FIG. 1A is a second schematic diagram of an application scenario of an image processing method according to some embodiments of the application.

First, a picture to be processed is obtained. Next, the picture to be processed is inputted into a mask prediction model, and a first mask image corresponding to a figure object in the picture to be processed is obtained. Subsequently, the first mask image and the picture to be processed are inputted into a mask quality unification model, to obtain a second mask image. Finally, the picture to be processed and the second mask image are inputted into a target image obtaining model, to obtain an image corresponding to the figure object.

An application scenario of the image processing method provided in the application is not limited in the embodiments of the application. For example, the image processing method provided in the application may further be applied to a scenario in which a server and a client work separately. The application scenario of the image processing method is merely an embodiment of an application scenario of the image processing method provided in the application. An objective of providing the application scenario embodiment is to facilitate understanding of the image processing method provided in the application, but is not intended to limit the image processing method provided in the application. Other application scenarios of the image processing method provided in the embodiments of the application are not elaborated herein.

Figure 2:
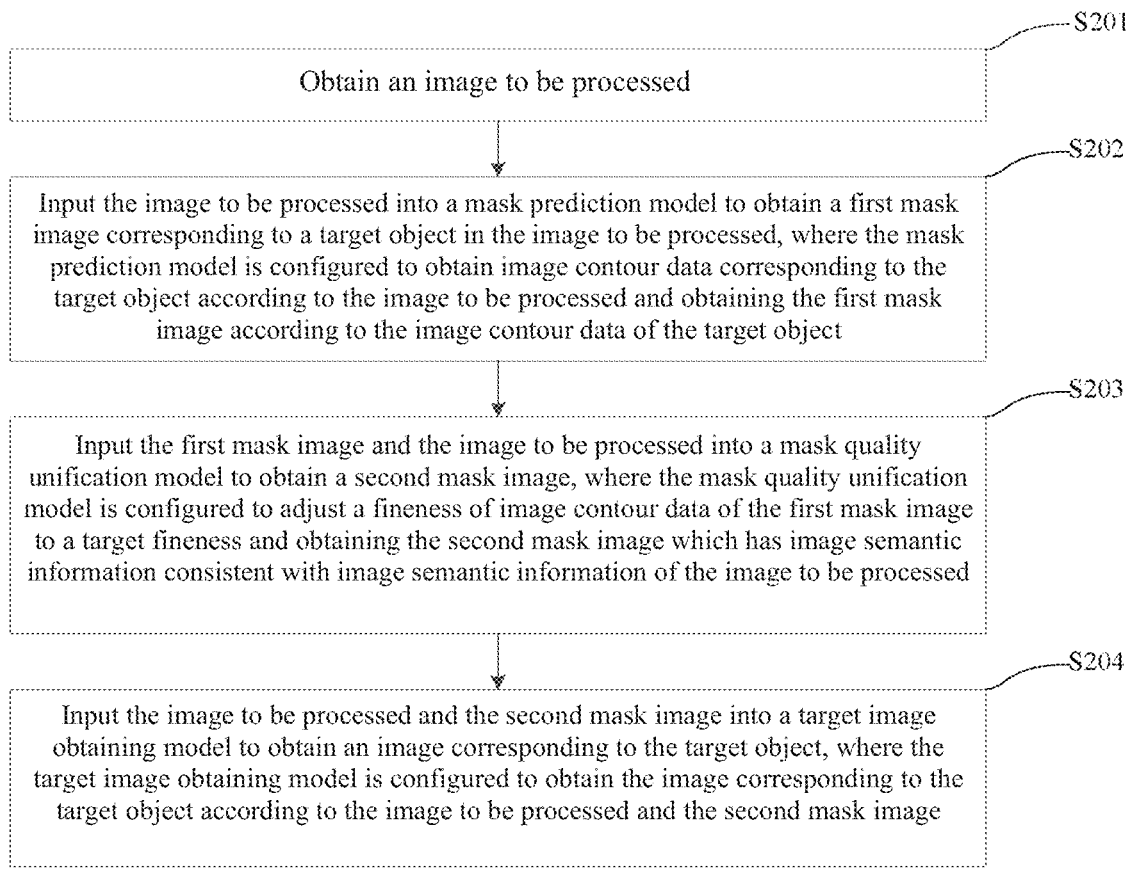
FIG. 2 is a flowchart of an image processing method, according to some embodiments of the application.
Figure 3:
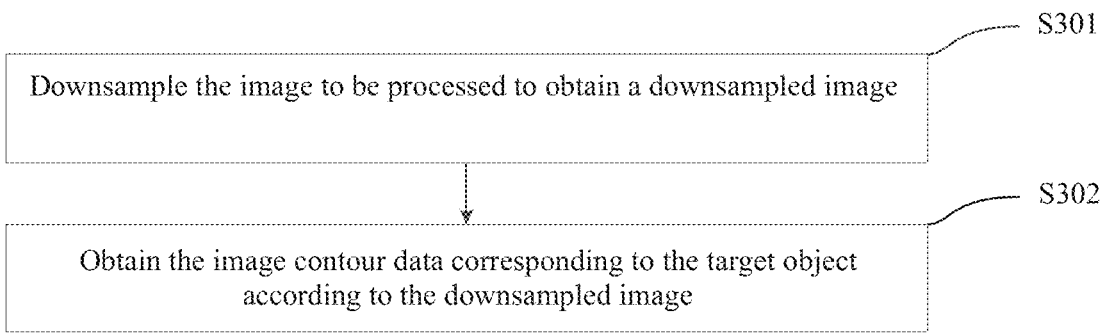
FIG. 3 is a flowchart of a method for obtaining image contour data corresponding to a target object, according to some embodiments of the application.

Some embodiments of the application provides an image processing method, and the following provides a description with reference to FIG. 2 and FIG. 3.

FIG. 2 is a flowchart of an image processing method, according to some embodiments of the application. The image processing method includes the following steps S201-S204.

Step S201: Obtaining an image to be processed.

In some embodiments, the image to be processed may be a picture obtained by an image acquisition device, a picture composited by image compositing software, an image obtained by image editing software or the like. For example, the image to be processed may be a picture shot by a camera of a mobile phone, or a picture obtained by compositing two or more pictures by using the image compositing software.

Step S202: Inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object.

In some embodiments, the target object in the image to be processed is a preselected object or may be an object selected from the image to be processed after target detection is performed on the image to be processed. For example, when the image to be processed is a self-portrait photograph of a user, the target object in the image to be processed may be a figure object corresponding to the user in the self-portrait photograph. A mask image is an image partially or completely blocking the picture to be processed to keep the blocked portion from participating in image processing. The mask image indicates a target area in the picture to be processed to be segmented from the picture to be processed.

In some embodiments, a process of obtaining a first mask image corresponding to a target object in the image to be processed may include: obtaining the image contour data corresponding to the target object, and obtaining the first mask image according to the image contour data of the target object. To reduce a computation amount of the image processing method provided in the embodiments with reference to FIG. 2, the image contour data corresponding to the target object may be obtained through the following steps. FIG. 3 is a flowchart of a method for obtaining image contour data corresponding to a target object, according to some embodiments of the application. The method for obtaining image contour data includes the following steps S301-S302.

Step S301: Downsampling the image to be processed to obtain a downsampled image.

The downsampling is a process of scaling down an image to make the image meet the size of a display area or generate a thumbnail corresponding to the image. In some embodiments, a process of downsampling the image to be processed to obtain a downsampled image may include: obtaining a designated downsampling factor for the image to be processed; and downsampling the image to be processed according to the designated downsampling factor, to obtain the downsampled image. A process of downsampling the image to be processed may be as follows: for an image to be processed with a resolution of 1000*1000, if a downsampling factor is 20, one pixel is taken from every 20 rows and columns of pixels in the image to be processed to form an image, and a downsampled image with a resolution of 50*50 is obtained.

Step S302: Obtaining the image contour data corresponding to the target object according to the downsampled image.

In some embodiments, a process of obtaining the image contour data corresponding to the target object according to the downsampled image includes performing image contour extraction on the target object in the downsampled image to obtain the image contour data corresponding to the target object.

Step S203: Inputting the first mask image and the image to be processed into a mask quality unification model, and obtain a second mask image, where the mask quality unification model is configured to adjust a fineness of image contour data of the first mask image to a target fineness and obtaining the second mask image which has image semantic information consistent with image semantic information of the image to be processed.

In some embodiments, the target fineness is a fineness determined according to a first fineness interval and a second fineness interval. The first fineness interval is a fineness interval of the image contour data of the first mask image obtained by the mask prediction model when the fineness of the image contour data of the target object does not reach the designated fineness threshold. The second fineness interval is a fineness interval of the image contour data of the first mask image obtained by the mask prediction model when the fineness of the image contour data of the target object reaches the designated fineness threshold. In some embodiments, a fineness of image contour data is a degree of precision and accuracy of image contour data, and the designated fineness threshold is a limit value that is preset for the image contour data and is used for determining a degree of precision and accuracy of the image contour data.

In some embodiments, the mask quality unification model may be obtained before the second mask image is obtained. A sample image is first obtained, and a sample first mask image corresponding to a target object in the sample image is obtained. Next, a target second mask image is obtained for the sample image and the sample first mask image. Finally, the mask quality unification model is obtained according to the sample image, the sample first mask image, and the target second mask image.

In some embodiments, a step of obtaining a second mask image may be as follows. First, a fineness of image contour data of the first mask image is obtained, and the fineness of the image contour data of the first mask image is compared with a target fineness. Next, if the fineness of the image contour data of the first mask image is less than the target fineness, the fineness of the image contour data of the first mask image is increased to the target fineness, to obtain the second mask image. If the fineness of the image contour data of the first mask image is greater than the target fineness, the fineness of the image contour data of the first mask image is reduced to the target fineness, to obtain the second mask image.

Step S204: Inputting the image to be processed and the second mask image into a target image obtaining model to obtain an image corresponding to the target object, where the target image obtaining model is configured to obtain the image corresponding to the target object according to the image to be processed and the second mask image.

In some embodiments, the step of obtaining an image corresponding to the target object is performed after the server obtains a request message that is sent by the client and used for requesting to obtain an image corresponding to the target object. After obtaining the image corresponding to the target object, the server may provide the image corresponding to the target object to the client in response to the request message. In the some embodiments, the step of obtaining an image corresponding to the target object is performed on the client. In this way, after the image corresponding to the target object is obtained, the image corresponding to the target object can be displayed. In some embodiments, the client is an application or a program that is installed on a computing device, may operate in cooperation with the server, and stores the image processing method for step S201 to step S204. The computing device may include: a computer, a smartphone, and the like, and the application or the program that is installed on the computing device and may operate in cooperation with the server may include: a client of an image processing APP installed on the smartphone, a client of an image processing APP installed on the computer, a client of a web version image processing tool operating on a web page or the like.

In some embodiments, the image corresponding to the target object is obtained by inputting the image to be processed and the second mask image into a target image obtaining model. Therefore, the target image obtaining model may be obtained first. A process may include the following. A sample image is first obtained, and a sample second mask image corresponding to a target object in the sample image is obtained. Next, a target image corresponding to the target object in the sample image is obtained for the sample image and the sample second mask image. Finally, the target image obtaining model is obtained according to the sample image, the sample second mask image, and the target image.

According to the image processing method provided in the application, after an image to be processed is inputted into a mask prediction model, the mask prediction model obtains image contour data corresponding to a target object according to the image to be processed and obtains a first mask image according to the image contour data of the target object. After the first mask image is obtained, a fineness of image contour data of the first mask image is further adjusted to a target fineness to obtain a second mask image. The target fineness may be determined according to a first fineness interval and a second fineness interval, and an image corresponding to the target object is obtained according to the image to be processed and the second mask image. According to the image processing method provided in the application, the first mask image is first obtained according to the image contour data of the target object, and the fineness of the image contour data of the first mask image is then adjusted to the target fineness, to obtain the second mask image, thereby ensuring the fineness of the image corresponding to the target object is obtained according to the image to be processed and the second mask image. The image contour data of the target object does not need to have a high fineness when the first mask image is obtained according to the image contour data of the target object, and the mask prediction model does not need to be trained by using a large number of sample images with finely labeled image contour data, thereby reducing costs of image segmentation.

Corresponding to the image processing method provided in the application scenario embodiment and the embodiments with reference to FIG. 2 and FIG. 3, the embodiments of the application further provides an image processing apparatus. An apparatus embodiment is basically similar to the application scenario embodiment and the embodiments with reference to FIG. 2 and FIG. 3, and therefore is described briefly. For related parts, reference may be made to the descriptions in the application scenario embodiment and the embodiments with reference to FIG. 2 and FIG. 3. The described apparatus embodiments are merely exemplary.

Figure 4:
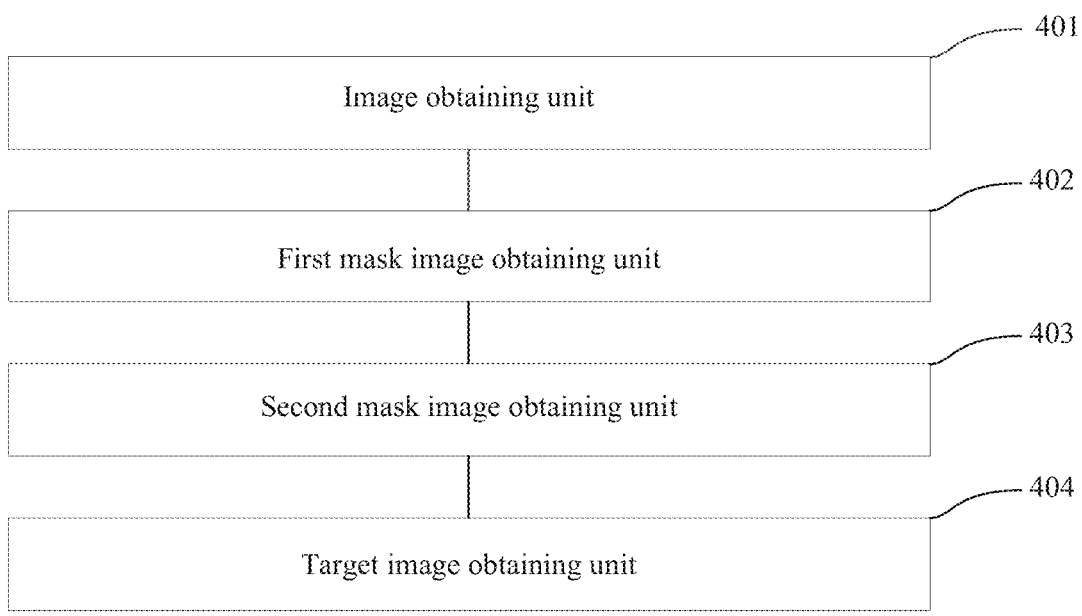
FIG. 4 is a schematic diagram of an image processing apparatus, according to some embodiments of the application.

FIG. 4 is a schematic diagram of an image processing apparatus, according to some embodiments of the application.

The image processing apparatus includes: an image obtaining unit 401 configured to obtain an image to be processed; a first mask image obtaining unit 402 configured to: input the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object; a second mask image obtaining unit 403 configured to: input the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and a target image obtaining unit 404 configured to: input the image to be processed and the second mask image into a target image obtaining model to obtain an image corresponding to the target object, where the target image obtaining model is configured to obtain the image corresponding to the target object according to the image to be processed and the second mask image.

In some embodiments, the first mask image obtaining unit 402 is configured to: obtain the image contour data corresponding to the target object and obtain the first mask image according to the image contour data of the target object.

In some embodiments, obtaining the image contour data corresponding to the target object includes: downsampling the image to be processed to obtain a downsampled image; and obtaining the image contour data corresponding to the target object according to the downsampled image.

In some embodiments, downsampling the image to be processed to obtain a downsampled image includes: obtaining a designated downsampling factor for the image to be processed; and downsampling the image to be processed according to the designated downsampling factor to obtain the downsampled image.

In some embodiments, obtaining the image contour data corresponding to the target object according to the downsampled image includes: performing image contour extraction on the target object in the downsampled image to obtain the image contour data corresponding to the target object.

In some embodiments, the image processing apparatus further includes: a target object providing unit configured to provide an image corresponding to the target object to a client.

In some embodiments, the image processing apparatus further includes: a request message obtaining unit configured to obtain, from the client, a request message for requesting to obtain the image corresponding to the target object.

The target object providing unit is configured to provide, in response to the request message, the image corresponding to the target object to the client.

In some embodiments, the image processing apparatus further includes: a target image display unit configured to display the image corresponding to the target object.

In some embodiments, the second mask image obtaining unit 403 is configured to: if the fineness of the image contour data of the first mask image is less than the target fineness, increase the fineness of the image contour data of the first mask image to the target fineness, to obtain the second mask image.

In some embodiments, the second mask image obtaining unit 403 is configured to: if the fineness of the image contour data of the first mask image is greater than the target fineness, reduce the fineness of the image contour data of the first mask image to the target fineness, to obtain the second mask image.

In some embodiments, the image processing apparatus further includes: a fineness obtaining unit configured to obtain the fineness of the image contour data of the first mask image; and a fineness comparison unit configured to compare the fineness of the image contour data of the first mask image with the target fineness.

In some embodiments, the image processing apparatus further includes: a first sample obtaining unit configured to: obtain a sample image, and obtain a sample first mask image corresponding to a target object in the sample image; a target second mask image obtaining unit configured to obtain a target second mask image for the sample image and the sample first mask image; and a mask quality unification model obtaining unit configured to obtain the mask quality unification model according to the sample image, the sample first mask image, and the target second mask image.

In some embodiments, the image processing apparatus further includes: a second sample obtaining unit configured to: obtain a sample image, and obtain a sample second mask image corresponding to a target object in the sample image; a target image obtaining unit configured to obtain, for the sample image and the sample second mask image, a target image corresponding to the target object in the sample image; and a target image obtaining model unit configured to obtain the target image obtaining model according to the sample image, the sample second mask image, and the target image.

According to the image processing apparatus provided in the embodiments with reference to FIG. 4, after an image to be processed is inputted into a mask prediction model, the mask prediction model obtains image contour data corresponding to a target object according to the image to be processed and obtains a first mask image according to the image contour data of the target object. After the first mask image is obtained, a fineness of image contour data of the first mask image is adjusted to a target fineness to obtain a second mask image. The target fineness is determined according to a first fineness interval and a second fineness interval, and an image corresponding to the target object is obtained according to the image to be processed and the second mask image. According to the data processing apparatus provided in the application, the first mask image is first obtained according to the image contour data of the target object, and the fineness of the image contour data of the first mask image is then adjusted to the target fineness to obtain the second mask image, thereby ensuring the fineness of the image corresponding to the target object is obtained according to the image to be processed and the second mask image. The image contour data of the target object does not need to have a high fineness when the first mask image is obtained according to the image contour data of the target object, and the mask prediction model does not need to be trained by using a large number of sample images with finely labeled image contour data, thereby reducing costs of image segmentation.

Corresponding to the image processing method provided in the application scenario embodiment and the embodiments referring to FIG. 2 and FIG. 3, the embodiments of the application provide an electronic device.

Figure 5:
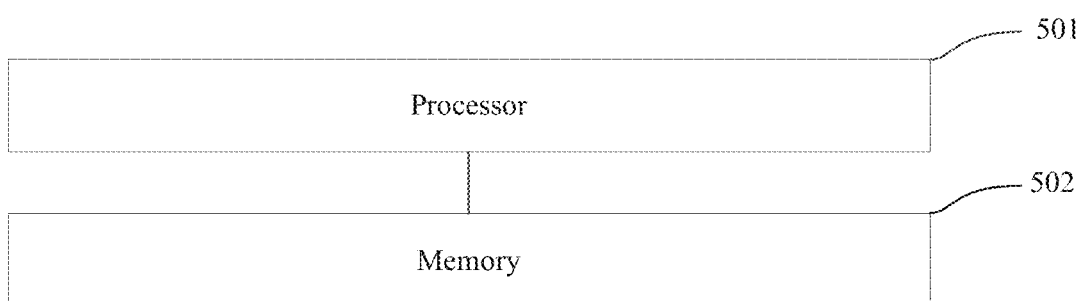
FIG. 5 is a schematic diagram of an electronic device, according to an embodiment of the application.

FIG. 5 is a schematic diagram of an electronic device, according to some embodiments of the application.

The electronic device includes: a processor 501; and a memory 502, configured to store a program of an image processing method, where the device is powered on and executes the program of the image processing method to perform the following steps:

obtaining an image to be processed;

inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;

inputting the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and inputting the image to be processed and the second mask image into a target image obtaining model to obtain an image corresponding to the target object, where the target image obtaining model is configured to obtain the image corresponding to the target object according to the image to be processed and the second mask image.

According to the image processing electronic device provided in the embodiments of the application, after an image to be processed is inputted into a mask prediction model, the mask prediction model obtains image contour data corresponding to a target object according to the image to be processed and obtains a first mask image according to the image contour data of the target object. After the first mask image is obtained, a fineness of image contour data of the first mask image is adjusted to a target fineness to obtain a second mask image. The target fineness is determined according to a first fineness interval and a second fineness interval, and an image corresponding to the target object is obtained according to the image to be processed and the second mask image. According to the data processing electronic device provided in the application, the first mask image is first obtained according to the image contour data of the target object, and the fineness of the image contour data of the first mask image is then adjusted to the target fineness to obtain the second mask image, thereby ensuring the fineness of the image corresponding to the target object is obtained according to the image to be processed and the second mask image. The image contour data of the target object does not need to have a high fineness when the first mask image is obtained according to the image contour data of the target object, and the mask prediction model does not need to be trained by using a large number of sample images with finely labeled image contour data, thereby reducing costs of image segmentation.

In some embodiments, a process of obtaining the image corresponding to the figure object according to the image to be processed and the second mask image may include: multiplying the second mask image by the image to be processed, to obtain the image corresponding to the figure object.

For a detailed description of the electronic device provided in the embodiments with reference to FIG. 5, reference may be made to the related description of the application scenario embodiment and the embodiments with reference to FIG. 2 and FIG. 3, and details are not described herein again.

Corresponding to the image processing method provided in the application scenario embodiment and the embodiments referring to FIG. 2 and FIG. 3, the embodiments of the application provides a storage medium, storing a program for the image processing method, and when being executed by a processor, the program performs the following steps:

obtaining an image to be processed;

inputting the image to be processed into a mask prediction model to obtain a first mask image corresponding to a target object in the image to be processed, where the mask prediction model is configured to obtain image contour data corresponding to the target object according to the image to be processed and obtaining the first mask image according to the image contour data of the target object;

inputting the first mask image and the image to be processed into a mask quality unification model to obtain a second mask image, where the mask quality unification model is configured to adjust a fineness of image contour data of the first mask image to a target fineness and obtaining a second mask image which has image semantic information consistent with image semantic information of the image to be processed; and inputting the image to be processed and the second mask image into a target image obtaining model to obtain an image corresponding to the target object, where the target image obtaining model is configured to: obtain an image corresponding to the target object according to the image to be processed and the second mask image.

According to the image processing storage medium provided in the embodiments of the application, after an image to be processed is inputted into a mask prediction model, the mask prediction model obtains image contour data corresponding to the image to be processed and obtains a first mask image according to the image contour data of the target object. After the first mask image is obtained, a fineness of image contour data of the first mask image is further adjusted to a target fineness to obtain a second mask image. The target fineness is determined according to a first fineness interval and a second fineness interval, and an image corresponding to the target object is obtained according to the image to be processed and the second mask image. According to the data processing storage medium provided in the application, the first mask image is first obtained according to the image contour data of the target object, and the fineness of the image contour data of the first mask image is then adjusted to the target fineness to obtain the second mask image, thereby ensuring the fineness of the image corresponding to the target object is obtained according to the image to be processed and the second mask image. The image contour data of the target object need not have a high fineness when the first mask image is obtained according to the image contour data of the target object, and the mask prediction model need not be trained by using a large number of sample images with finely labeled image contour data, thereby reducing costs of image segmentation.

For a detailed description of the storage medium for image processing, reference may be made to the related description of the application scenario embodiment and the embodiments referring to FIG. 2 and FIG. 3, and details are not described herein again.

Figure 6:
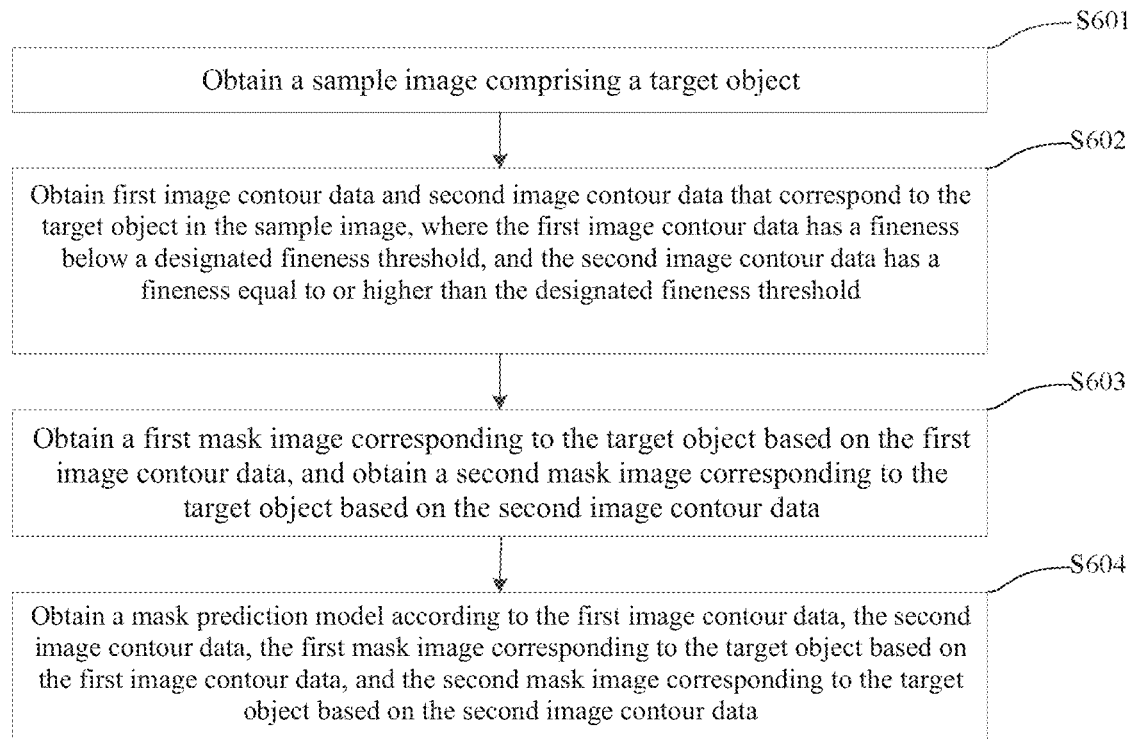
FIG. 6 is a flowchart of a method for processing a mask prediction model, according to some embodiments of the application.

The embodiments of the application provide a method for processing a mask prediction model, and the following provides a description with reference to FIG. 6.

FIG. 6 is a flowchart of a method for processing a mask prediction model, according to some embodiments of the application. The method for processing a mask prediction model includes the following steps S601-S604.

Step S601: Obtaining a sample image comprising a target object.

Step S602: Obtaining first image contour data and second image contour data that correspond to the target object in the sample image, where the first image contour data has a fineness below a designated fineness threshold, and the second image contour data has a fineness equal to or higher than the designated fineness threshold.

Step S603: Obtaining a first mask image corresponding to the target object based on the first image contour data, and obtaining a second mask image corresponding to the target object based on the second image contour data.

Step S604: Obtaining a mask prediction model according to the first image contour data, the second image contour data, the first mask image corresponding to the target object based on the first image contour data, and the second mask image corresponding to the target object based on the second image contour data.

In some embodiments, obtaining first image contour data and second image contour data that correspond to a target object in the sample image includes: downsampling the sample image to obtain a downsampled sample image; and obtaining the first image contour data and the second image contour data according to the downsampled sample image.

In some embodiments, downsampling the sample image to obtain a downsampled sample image includes: obtaining a designated downsampling factor for the sample image; and downsampling the sample image according to the designated downsampling factor, to obtain the downsampled sample image.

In some embodiments, obtaining the first image contour data and the second image contour data according to the downsampled sample image includes: performing image contour extraction on the target object in the downsampled sample image to obtain the first image contour data and the second image contour data.

According to the method for processing a mask prediction model provided in the embodiments referring to FIG. 6, a sample image is first obtained; first image contour data and second image contour data that correspond to a target object in the sample image are then obtained for the sample image, the first image contour data has a fineness below a designated fineness threshold, and the second image contour data has a fineness equal to or higher than the designated fineness threshold; subsequently, a first mask image corresponding to the target object based on the first image contour data is obtained, and a second mask image corresponding to the target object based on the second image contour data is obtained; and a mask prediction model is obtained according to the first image contour data, the second image contour data, the first mask image corresponding to the target object, and the second mask image corresponding to the target object, and the mask prediction model is configured to obtain image contour data corresponding to a target object in an image to be processed according to the image to be processed and obtaining a first mask image corresponding to the target object according to the image contour data of the target object. According to the method for processing a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model.

Corresponding to the method for processing a mask prediction model provided in the embodiments referring to FIG. 6, the embodiments of the application further provides an apparatus for processing a mask prediction model. An apparatus embodiment is basically similar to the method embodiments referring to FIG. 6, and therefore is described briefly. For related parts, reference may be made to the descriptions of the method embodiments. The described apparatus embodiments are merely exemplary.

Figure 7:
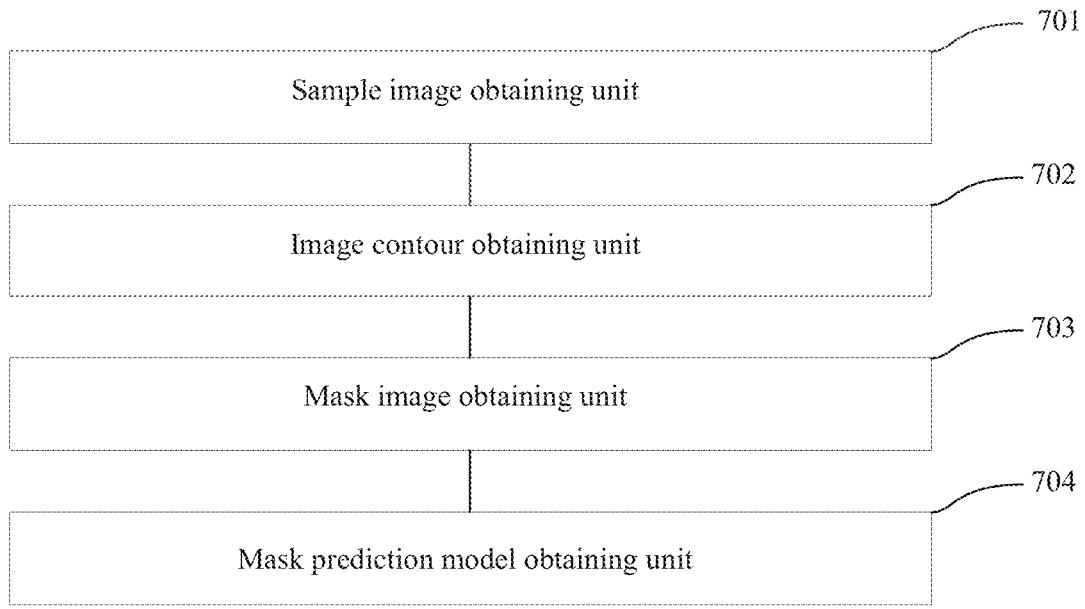
FIG. 7 is a schematic diagram of an apparatus for processing a mask prediction model, according to some embodiments of the application.

FIG. 7 is a schematic diagram of an apparatus for processing a mask prediction model, according to some embodiments of the application.

The apparatus for processing a mask prediction model includes:
- a sample image obtaining unit 701 configured to obtain a sample image comprising a target object;
- an image contour obtaining unit 702 configured to obtain first image contour data and second image contour data that correspond to the target object in the sample image, where the first image contour data has a fineness below a designated fineness threshold, and the second image contour data has a fineness equal to or higher than the designated fineness threshold;
- a mask image obtaining unit 703 configured to: obtain a first mask image corresponding to the target object based on the first image contour data, and obtain a second mask image corresponding to the target object based on the second image contour data; and
- a mask prediction model obtaining unit 704 configured to obtain a mask prediction model according to the first image contour data, the second image contour data, the first mask image corresponding to the target object, and the second mask image corresponding to the target object, where the mask prediction model is configured to obtain image contour data corresponding to a target object in an image to be processed according to the image to be processed and obtaining a first mask image corresponding to the target object according to the image contour data of the target object.

In some embodiments, the image contour obtaining unit 702 is configured to: downsampling the sample image to obtain the downsampled sample image; and obtain the first image contour data and the second image contour data according to the downsampled sample image.

In some embodiments, downsampling the sample image to obtain a downsampled sample image includes: obtaining a designated downsampling factor for the sample image; and downsampling the sample image according to the designated downsampling factor, to obtain the downsampled sample image.

In some embodiments, obtaining the first image contour data and the second image contour data according to the downsampled sample image includes: performing image contour extraction on the target object in the downsampled sample image to obtain the first image contour data and the second image contour data.

According to the apparatus for processing a mask prediction model provided in the embodiments of the application, a sample image is first obtained; first image contour data and second image contour data that correspond to a target object in the sample image are then obtained for the sample image, the first image contour data has a fineness below a designated fineness threshold, and the second image contour data has a fineness equal to or higher than the designated fineness threshold; subsequently, a mask image corresponding to the target object based on the first image contour data is obtained, and a mask image corresponding to the target object based on the second image contour data is obtained; and a mask prediction model is obtained according to the first image contour data, the second image contour data, the mask image corresponding to the target object based on the first image contour data, and the mask image corresponding to the target object based on the second image contour data, and the mask prediction model is configured to obtain image contour data corresponding to a target object in an image to be processed according to the image to be processed and obtaining a first mask image corresponding to the target object according to the image contour data of the target object. According to the apparatus for processing a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model.

Corresponding to the method for processing a mask prediction model provided in the embodiments referring to FIG. 6, the embodiments of the application provides an electronic device.

FIG. 5 is a schematic diagram of an electronic device, according to some embodiments of the application.

The electronic device includes: a processor 501; and a memory 502 configured to store a program for a method for processing a mask prediction model, where the device is powered on and executes the program of the method for processing a mask prediction model to perform the following steps:
- obtaining a sample image;
- obtaining first image contour data and second image contour data that correspond to a target object in the sample image, where the first image contour data has a fineness below a designated fineness threshold, and the second image contour data has a fineness equal to or higher than the designated fineness threshold;
- obtaining a mask image corresponding to the target object based on the first image contour data, and obtaining a mask image corresponding to the target object based on the second image contour data; and
- obtaining a mask prediction model according to the first image contour data, the second image contour data, the mask image corresponding to the target object based on the first image contour data, and the mask image corresponding to the target object based on the second image contour data, where the mask prediction model is configured to obtain image contour data corresponding to a target object in an image to be processed according to the image to be processed and obtaining a first mask image corresponding to the target object according to the image contour data of the target object.

According to the electronic device for processing a mask prediction model, a sample image is first obtained; first image contour data and second image contour data that correspond to a target object in the sample image are then obtained for the sample image, the first image contour data has a fineness below a designated fineness threshold, and the second image contour data has a fineness equal to or higher than the designated fineness threshold; subsequently, a mask image corresponding to the target object based on the first image contour data is obtained, and a mask image corresponding to the target object based on the second image contour data is obtained; and a mask prediction model is obtained according to the first image contour data, the second image contour data, the mask image corresponding to the target object based on the first image contour data, and the mask image corresponding to the target object based on the second image contour data, and the mask prediction model is configured to obtain image contour data corresponding to a target object in an image to be processed according to the image to be processed and obtaining a first mask image corresponding to the target object according to the image contour data of the target object. According to the electronic device for processing a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model.

For a detailed description of the electronic device for processing a mask prediction model, reference may be made to the related description of the embodiments referring to FIG. 6, and details are not described herein again.

Corresponding to the method for processing a mask prediction model provided in the embodiments referring to FIG. 6, the embodiments of the application provides a storage medium, storing a program of a method for processing a mask prediction model, when being executed by a processor, the program performs the following steps:

obtaining a sample image;

obtaining first image contour data and second image contour data that correspond to a target object in the sample image, where the first image contour data has a fineness below a designated fineness threshold, and the second image contour data has a fineness equal to or higher than the designated fineness threshold;

obtaining a mask image corresponding to the target object based on the first image contour data, and obtaining a mask image corresponding to the target object based on the second image contour data; and obtaining a mask prediction model according to the first image contour data, the second image contour data, the mask image corresponding to the target object based on the first image contour data, and the mask image corresponding to the target object based on the second image contour data, where the mask prediction model is configured to obtain image contour data corresponding to a target object in an image to be processed according to the image to be processed and obtaining a first mask image corresponding to the target object according to the image contour data of the target object.

According to the storage medium for processing a mask prediction model, a sample image is first obtained; first image contour data and second image contour data that correspond to a target object in the sample image are then obtained for the sample image, the first image contour data has a fineness below a designated fineness threshold, and the second image contour data has a fineness equal to or higher than the designated fineness threshold; subsequently, a mask image corresponding to the target object based on the first image contour data is obtained, and a mask image corresponding to the target object based on the second image contour data is obtained; and a mask prediction model is obtained according to the first image contour data, the second image contour data, the mask image corresponding to the target object based on the first image contour data, and the mask image corresponding to the target object based on the second image contour data, and the mask prediction model is configured to obtain image contour data corresponding to a target object in an image to be processed according to the image to be processed and obtaining a first mask image corresponding to the target object according to the image contour data of the target object. According to the storage medium for processing a mask prediction model provided in the application, in a process of obtaining the mask prediction model, both the first image contour data whose fineness does not reach the designated fineness threshold and the second image contour data whose fineness reaches the designated fineness threshold are used, thereby reducing costs of obtaining the mask prediction model.

For a detailed description of the storage medium for processing a mask prediction model, reference may be made to the related description of the embodiments referring to FIG. 6, and details are not described herein again.

Although the application has been described with reference to embodiments, the embodiments are not intended to limit the application. A person of ordinary skill in the art can make various variations and modifications without departing from the spirit and scope of the present invention. Therefore, the protection scope of the application is subject to a scope defined by claims.

In a typical configuration, a computing device includes one or more processors (CPUs), an input/output interface, a network interface, and a memory.

The memory may include forms such as a volatile memory in a computer-readable medium, a random access memory (RAM), and/or a non-volatile memory, for example, a read-only memory (ROM) or a flash memory (flash RAM). The memory is an example of the computer readable medium.

The computer readable medium includes a non-volatile medium and a volatile medium, a removable medium and a non-removable medium, which may implement storage of information by using any method or technology. The information may be computer-readable instructions, a data structure, a module of a program or other data. Examples of a storage medium of a computer include, but are not limited to, a phase change memory (PRAM), a static random access memory (SRAM), a dynamic random access memory (DRAM), or other types of RAM, a ROM, an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. As defined herein, the computer-readable media do not include non-transitory computer-readable media (transitory media), for example, modulated data signals and carriers.

A person skilled in the art should understand that the embodiments of the application may be provided as methods, systems, or computer program products. Therefore, the application may use a form of total hardware only embodiments, software only embodiments, or embodiments with a combination of software and hardware. Moreover, the application may be in a form of a computer program product implemented on one or more computer-usable storage media (including but not limited to a disk memory, a CD-ROM, an optical memory, and the like) that include computer-usable program code.

What is claimed is:

1. An image processing method, comprising:

obtaining an image comprising a target object;

inputting the image into a mask prediction model to obtain a first mask image corresponding to the target object in the image;

inputting the first mask image and the image comprising the target object into a mask quality unification model to obtain a second mask image, wherein the mask quality unification model is configured to adjust a fineness associated with the first mask image to a target fineness to obtain the second mask image, and wherein the second mask image has image semantic information consistent with image semantic information of the image comprising the target object, wherein the fineness associated with the first mask image is a fineness of image contour data of the target object, and the inputting the first mask image and the image into the mask quality unification model to obtain the second mask image comprises:

obtaining the fineness of the image contour data of the target object;

comparing the fineness of the image contour data of the target object with the target fineness; and if the fineness associated with the first mask image is greater than the target fineness, reducing, by the mask quality unification model, the fineness associated with the first mask image to the target fineness; and inputting the image comprising the target object and the second mask image into a target image obtaining model to obtain a target image corresponding to the target object.

2. The image processing method according to claim 1, wherein inputting the image into a mask prediction model to obtain a first mask image corresponding to the target object in the image comprises:

obtaining image contour data of the target object; and obtaining the first mask image according to the image contour data of the target object.

3. The image processing method according to claim 2, wherein obtaining image contour data of the target object comprises:

downsampling the image comprising the target object to obtain a downsampled image; and obtaining the image contour data of the target object according to the downsampled image.

4. The image processing method according to claim 3, wherein downsampling the image comprising the target object to obtain a downsampled image comprises:

obtaining a downsampling factor for the image comprising the target object; and downsampling the image comprising the target object according to the downsampling factor to obtain the downsampled image.

5. The image processing method according to claim 3, wherein obtaining the image contour data of the target object according to the downsampled image comprises:

performing image contour extraction on the target object in the downsampled image to obtain the image contour data of the target object.

6. The image processing method according to claim 1, further comprising:

providing the target image corresponding to the target object to a client.

7. The image processing method according to claim 6, further comprising:

obtaining, from the client, a request message for requesting to obtain the target image corresponding to the target object; wherein providing the target image corresponding to the target object to a client comprises: providing, in response to the request message, the image corresponding to the target object to the client.

8. The image processing method according to claim 1, further comprising:

displaying the target image corresponding to the target object.

9. The image processing method according to claim 1, wherein inputting the first mask image and the image comprising the target object into a mask quality unification model to obtain a second mask image comprises:

in response to the fineness of the image contour data of the target object being less than the target fineness, increasing the fineness of the image contour data of the target object to the target fineness to obtain the second mask image.

10. The image processing method according to claim 1, further comprising:

obtaining a sample image comprising a sample target object;

obtaining a sample first mask image corresponding to the sample target object in the sample image;

obtaining a target second mask image for the sample image and the sample first mask image;

and obtaining the mask quality unification model according to the sample image, the sample first mask image, and the target second mask image.

11. The image processing method according to claim 1, further comprising:

obtaining a sample image comprising a sample target object;

obtaining a sample mask image corresponding to the sample target object in the sample image;

obtaining, for the sample image and the sample mask image, a sample target image corresponding to the sample target object in the sample image; and obtaining a target image obtaining model according to the sample image, the sample mask image, and the sample target image.

12. An image processing apparatus, comprising: one or more processors and one or more non-transitory computer-readable memories coupled to the one or more processors and configured with instructions executable by the one or more processors to cause the apparatus to perform operations comprising:

obtaining an image comprising a target object;

inputting the image into a mask prediction model to obtain a first mask image corresponding to the target object in the image;

inputting the first mask image and the image comprising the target object into a mask quality unification model to obtain a second mask image, wherein the mask quality unification model is configured to adjust a fineness associated with the first mask image to a target fineness to obtain the second mask image, and wherein the second mask image has image semantic information consistent with image semantic information of the image comprising the target object, wherein the fineness associated with the first mask image is a fineness of image contour data of the target object, and the inputting the first mask image and the image into the mask quality unification model to obtain the second mask image comprises:

obtaining the fineness of the image contour data of the target object;

comparing the fineness of the image contour data of the target object with the target fineness; and if the fineness associated with the first mask image is greater than the target fineness, reducing, by the mask quality unification model, the fineness associated with the first mask image to the target fineness; and inputting the image comprising the target object and the second mask image into a target image obtaining model to obtain a target image corresponding to the target object.

13. The image processing apparatus according to claim 12, wherein inputting the image into a mask prediction model to obtain a first mask image corresponding to the target object in the image comprises:
  obtaining image contour data of the target object; and
  obtaining the first mask image according to the image contour data of the target object.

14. The image processing apparatus according to claim 13, wherein obtaining image contour data of the target object comprises:
  downsampling the image comprising the target object to obtain a downsampled image; and
  obtaining the image contour data of the target object according to the downsampled image.

* * * * *